United States Patent [19]
Dronov et al.

[11] 3,980,584
[45] Sept. 14, 1976

[54] CARRIER AND CATALYST FOR CHEMICAL PROCESSES AND METHOD OF PREPARING SAID CATALYST

[76] Inventors: Alexei Efimovich Dronov, ulitsa Chapaeva, 12a, kv. 21; Nikolai Nikitovich Axenov, ulitsa Druzhby, 19a, kv. 26; Lolly Ivanovich Kozlov, ulitsa Komsomolskaya, 39, kv. 39, all of Novomoskovsk Tulskoi oblasti; Vladimir Petrovich Semenov, Vatkovsky pereulok, 4/6, kv. 69, Moscow; Viktor Stanislavovich Sobolevsky, ulitsa Moskovskaya, 2/14, kv. 5, Novomoskovsk Tulskoi oblasti; Viktor Ivanovich Yagodkin, ulitsa Kalinina, 32, kv. 15, Novomoskovsk, Tulskoi oblasti; Evgeny Zinovievich Golosman, ulitsa L. Tolstogo, 1/46, kv. 1, Novomoskovsk, Tulskoi oblasti; Arkady Mefodievich Alexeev, pereulok Obukha, 4, kv. 98, Moscow; David Borisovich Chistozvonov, ulitsa Kirova, 4, kv. 51, Novomoskovsk, Tulskoi oblasti; Tsezar Iosifovich Shumlyakovsky, ulitsa Lisichanskaya, 20, kv. 60; Nikolai Savelievich Ulyanov, ulitsa Komsomolskaya, 20, kv. 12, both of severodonetsk, Voroshilovgradskoi oblasti, all of U.S.S.R.

[22] Filed: Aug. 21, 1974

[21] Appl. No.: 499,196

[52] U.S. Cl............................. 252/432; 252/455 R; 252/463; 252/465; 252/466 J
[51] Int. Cl.²................... B01J 21/02; B01J 21/04; B01J 21/06; B01J 23/84
[58] Field of Search................ 252/463, 466 J, 432, 252/455 R, 465; 106/62, 73.33, 73.4

[56] References Cited
UNITED STATES PATENTS

| 2,252,981 | 8/1941 | Ridgway | 106/73.33 |
| 2,799,661 | 7/1957 | DeRosset | 252/465 |
| 2,928,814 | 3/1960 | Mills et al. | 252/463 X |
| 3,366,705 | 1/1968 | Giannetti et al. | 252/470 X |
| 3,436,358 | 4/1969 | Thygesen | 252/463 X |
| 3,600,429 | 8/1971 | Kronig et al. | 252/466 J |
| 3,641,182 | 2/1972 | Box et al. | 260/680 R |
| 3,669,906 | 6/1972 | Koberstein et al. | 252/465 |

*Primary Examiner*—W. J. Shine
*Attorney, Agent, or Firm*—Robert E. Burns; Emmanuel J. Lobato; Bruce L. Adams

[57] ABSTRACT

The carrier for catalysts used in chemical processes to convert natural gas is a fused mixture of aluminium oxide taken in the quantity of not less than 50 per cent by weight with at least one refractory oxide selected from the group, consisting of titanium oxides, nickel oxides, magnesium oxide, calcium oxide, iron oxides, silicon dioxide, boron oxide, and chromium oxides. An example of such a mixture is metallurgical slag which is formed in the production of ferro titanium ferrochromoboron, ferroboral, nickelboron, ferroboron prepared by the alluminothermy. As an active component is applied to the carrier, the catalyst is prepared. The catalyst can also be a mechanical mixture of the active component with the carrier. The active component can be any metal, for example nickel, chromium, aluminium, silver, platinum, copper and other metals which are selected depending on the requirements of a particular process. The content of the active component is from 0.3 to 40 per cent by weight calculating with reference to metal.

8 Claims, No Drawings

CARRIER AND CATALYST FOR CHEMICAL PROCESSES AND METHOD OF PREPARING SAID CATALYST

The present invention relates to catalysis and more particularly to carriers and catalysts employed in various chemical processes, e.g. in processes of conversion of natural gas, dissociation of ammonia, and also to methods of preparing catalyst.

Known in the prior art are such carriers as Portland cement, magnesite, natural clays, alumina. These carriers are widely used in chemistry, and catalysts are prepared on their bases with an addition of a promoting agent. However, catalysts in which the active component is applied to these carriers have low thermal stability and poor strength.

Known widely is an industrial catalyst (cf. Inventor's Certificate of USSR No. 253,772) in which the active component, vis., nickel, taken in the quantity of 7 percent by weight (as NiO) is applied to alumina, but the catalyst mechanical strength and thermal stability are also insufficient. The catalyst only withstands 20 cycles in the range of temperatures from 25 to 1200°C and it cracks at a temperature of 1800°-2050°C. Its mechanical strength is 600–800 kg/sq.cm.

As a result of insufficient thermal and mechanical strength, this catalyst is destroyed in the process of natural gas conversion, it shrinks considerably and is subject to attrition with formation of the catalyst dust. Destruction and shrinkage of the catalyst become more intense with increasing pressure and temperature in the process of conversion of natural gas; at the same time the modern trends in industrial conversion of natural gas are characterized by increasing temperatures and pressures.

In connection with the insufficient thermal stability the catalyst has comparatively short life. Moreover, as the catalyst is destroyed, dust is formed which increases the resistance of the catalyst bed and deteriorates the hydrodynamics of the process, which in turn leads to increased methane content of the converted gas. These disadvantages are responsible for frequent stoppage of the convertors during which fresh catalyst is added or the catalyst charge is renewed completely. The catalyst consumption in the process is thus increased. The yield of the process decreases, while the consumption of the catalyst and natural gas, steam and oxygen increases.

The continuous working term of an industrial converter, loaded with the known catalyst for the steam-oxygen conversion of natural gas at pressures from 16 to 20 atmospheres, is one or two months. The monthly requirement for the catalyst (to replenish the catalyst loss) is about 2–3 tons per converter. Thus, the additional requirement for the catalyst for a methane convertor of 12-cu.m. capacity is 12–18 tons in six months. The total service life of the catalyst does not exceed 6 months.

The object of the invention is to provide such a carrier that would improve the properties of the catalyst, namely would increase its thermal stability, activity and mechanical strength, and would also decrease its bulk weight, and moreover, would make the carrier inactive with respect to the active component applied thereto.

The object has been attained in that proposed as a carrier of a catalyst for chemical processes is a fused mixture of oxides of aluminum taken in the quantity not less than 50 percent, with at least one of the refractory oxides, namely oxides of titanium, nickel, magnesium, calcium, silicon, iron, boron, and chromium.

According to the invention, proposed is a carrier which is a fused mixture of oxides, consisting of oxides of aluminium taken in the quantity of 79–99.7 percent by weight and of titanium oxides taken in the quantity of 0.3 to 21 percent by weight.

Proposed also is a carrier which is a fused mixture of oxides taken in the following quantities, in percent by weight: alumnium oxide 50–80, titanium oxides 0.–18, nickel oxides, 0.–10, magnesium oxide 1–10, calcium oxide 3–25, iron oxides 1–20, silicon dioxide 1–4, boron oxide 0–15, and chromium oxides 0–1.

The mixture of the above named refractory oxides, in the fused state, gives the catalyst increased thermal stability (over 50 cycles of temperature change) within the range of temperature from 25°to 1200°C, increased mechanical strength to 2800 kg/sq.cm (the catalyst is not destroyed in the process of conversion) and high activity (during conversion of natural gas with two volumes of steam at a temperature of 800°C, and under a pressure of one atmosphere, the residual content of methane is not over 0.5 percent by volume). The carrier in the form of a fused mixture of the above named oxides, is inactive towards the active component of the catalyst applied thereto.

Any active component can be applied to the surfaces of the proposed carrier, for example, nickel, aluminium, platinum, silver, copper, zinc, chromium, etc. The active component is selected depending on the particular conditions of the process. Of greatest practical importance is the multicomponent carrier, the oxides of which are treated at high temperatures. This carrier is actually metallurgical slag, the waste of metallurgical industry.

In this connection, proposed as the carrier for catalysts, is metallurgical slag which is a fused mixture of refractory oxides, taken in the following quantities, in percent by weight: aluminium oxide 50–80, nickel oxides 0–10, titanium oxides 0–18, magnesium oxide 1–10, calcium oxide 3–25, iron oxides 1–20, silicon dioxide 1–4, chromium oxides 0–15, and sulphur oxides 0.02–0.05 calculated as $SO_3$.

Slag having the above specified composition is formed in the manufacture of ferrotitanium, ferroboron, ferrochromoboron, nickelboron, ferroboral by the aluminothermy. Taking into consideration the fact that metallurgical slags are waste materials, the commercial value of the proposed invention becomes even more apparent.

The chemical composition of slags, their bulk weight and the melting points are given in Table 1.

Slags do not contain poisons which deteriorate the properties of catalysts. The only poison is sulphur, but it is contained in small quantities, to 0.05% (w/w) which is practically fully volatilized during the process of preparing the catalyst.

According to the invention, the slag can be used for preparing the said catalyst both alone and together with the other high-melting oxides, for example with aluminium oxide, magnesium oxide, oxides of titanium, chromium, zirconium, and other suitable oxides, and also in combination with burning-out additives and volatile components. All these additives can be introduced during the process of preparing the catalyst.

If slag alone is used for preparing the catalyst carrier, and no additives are used, the preparation of the carrier, before applying the active component thereto, presents no difficulties and only consists in crushing in to the particle size of 10 – 100 mm, washing, if necessary, boiling in distilled water, and drying. The slag is ready for application of the active component thereto.

Table 1

| Alloy | Chemical composition of slag, in per cent by weight | | | | | | | | | | Bulk wt. of slag having pieces sizing 150 mm, ton/cu.m. | M.p., °C |
|---|---|---|---|---|---|---|---|---|---|---|---|---|
| | Al₂O₃ | NiO | TiO₂ | MgO | CaO | FeO | SiO₂ | B₂O₃ | Cr₂O₃ | S | | |
| Ferro-titanium | 60–80 | — | 0.3–18 | 1–7 | 6–14 | 1–3 | 0.1–3 | | | 0.01–0.05 | 1.6–2.1 | 1700–1900 |
| Nickel- | 55–75 | 1–10 | — | 3–10 | 3–20 | 1–3 | 1–3 | 10–15 | | " | " | 1600–1700 |
| Ferro-boron | 60–75 | | — | 3–10 | 5–15 | 2–5 | 1–3 | 7–10 | | " | " | 1500–1700 |
| Ferro- | 50–60 | | — | 3–9 | 8–25 | 14–20 | 2.5–4 | 6–10 | | " | " | 1300–1500 |
| Ferro-chromoboron | 60–70 | | — | 3–10 | 8–12 | 2–4 | 1–2 | 10–14 | 0.4–1 | " | " | 1300–1500 |

As it has already been said, the active component is selected depending on the particular process in which it will be used.

The active component can be applied to the proposed carrier by various methods, for example by impregnating the carrier with aqueous solutions of salts of the corresponding metals or by mechanically mixing the carrier with the active component with subsequent wetting, granulating, drying, and calcining.

According to the invention, the prepared catalyst is for various chemical processes, in which the active component is applied to the carrier which is a fused mixture of aluminium oxide taken in the quantity of not less than 50 percent by weight with at least one of refractory oxides, namely oxides, of titanium, nickel, magnesium, calcium, iron, silicon, boron or chromium.

The active component can be any metal, for example, nickel, aluminium, platinum, copper, zinc, palladium, silver, and others. The active component is selected depending on the particular chemical process in which it will be used. For example, for the conversion of natural gas, dissociation of ammonia, conversion of methane homologues, nickel is the active component; chromium, copper and zinc are active components for the manufacture of methyl alcohol; nickel, platinum, or palladium are the active components for the catalyst intended for decomposition of nitrogen oxides, and zinc, chromium and copper are active components for conversion of carbon monoxide.

Depending on the composition of the carrier, various modifications of the catalyst are possible, for example, the catalyst in which the active component is applied to a fused mixture of oxides consisting of aluminium oxide taken in the quantity of 79 – 99.7 percent by weight, and titanium oxides, taken in the quantity from 0.3 to 21 percent by weight.

Proposed also is the catalyst in which the active component is applied to a carrier which is fused mixture of refractory oxides having the following composition, in percent by weight: aluminium oxide 50—80, titanium oxides 0–18, nickel oxides 0–10, magnesium oxide 1–10, calcium oxide 3–25, iron oxides 1–20, silicon dioxide 1–4, boron oxide 0–15, chromium oxides 0–1. In such a case the preferable carrier is the slag prepared in the manufacture of ferrotitanium, nickelboron, ferroboral, ferrochromoboron by the aluminothermic method.

The content of the active component in the catalyst is in all cases from 0.3 to 40 percent by weight, calculating with reference to metal. As it has already been said, slags do not contain catalytic poisons which impair properties of the catalyst. The presence of small quantities of sulphur does not produce effect on the activity of the catalyst either, since greater part of sulphur is volatilized during preparation of the catalyst, and the traces of sulphur that may theoretically remain in the catalyst are removed completely within the initial 10–15 hours of the catalyst operation. The said slag is an industrial waste and its utilization will be profitable in itself. Catalysts, in which the active component is applied to metallurgical slag, are cheap and possess better properties compared with the known catalysts. The proposed catalysts possess high thermal stability characterized by resistance to more than 100 cyclic variations of temperature within the range from 25° to 1200°C while the known catalyst cannot with stand more than 20 such cyclic temperature fluctuations. An important index of thermal stability of the proposed catalysts is that they are practically not destroyed with heating to temperatures to 1800°C, while the known catalyst is destroyed at temperatures within the specified range.

The catalysts possess high mechanical strength characterized by 2800 kg/sq.cm, which is 2–3 times that of the known catalyst. The catalysts are sufficiently active in chemical processes. For example, during conversion of natural gas with steam at a volumetric ratio of steam to gas of 2:1, at a temperature of 800°C, at a pressure of one atmosphere, the space rate (with respect to the starting dry natural gas) of 2000 hour$^{-1}$ and in the absence of sulphur in the gas, the residual content of methane in the converted gas does not exceed 0.5 percent by volume.

The proposed catalyst can be used in many chemical processes, for example, in low-temperature conversion of methane homologues, dissociation of ammonia in the preparation of hydrogen, in purification of exhaust gases from nitrogen oxide, in the manufacture of nitric, sulphuric and oxalic acids, in hydration of fats, oils, in the manufacture of formaldehyde, and in other processes.

The proposed catalyst can be prepared by various methods.

One of the methods for preparing the catalyst consists in that the active component is applied to the carrier by impregnating it with aqueous solutions of salts of the corresponding metals with subsequent decomposition of the salts at temperatures of their decomposition.

Another method for preparing the proposed catalyst consists in that the carrier and the active component, taken in the form of oxides, are mixed, the obtained mixture is wetted with nitric acid, granulated and calcined.

Below follows a description of a preferable method for preparing the catalyst according to the invention. The method consists of the following steps: (1) mixing slag obtained from the manufacture of ferrotitanium, ground to particles sizing not over 0.05 mm and taken in the quantity of 10–90 percent by weight, with alumina having particle size not over 0.05 mm, taken in the quantity from 10 to 90 percent; (2) introduction into the obtained mixture of a combustible additive, for example, petroleum coke or wood meal; (3) treating the obtained mixture with nitric acid with stirring until a homogeneous mixture is obtained; (4) granulation of the obtained mass; (5) drying of the granules at a temperature to 200°C; (6) calcining the carrier granules at a temperature from 800° to 1600°C; (7) impregnation of cooled granules of the carrier with an aqueous solution of salts of the appropriate metals; (8) calcining the carrier granules with the salts of the active metal applied to it at temperatures sufficient to decompose the salts.

Petroleum coke is added in the quantity from 1 to 30 percent by weight, and wood meal in the quantity from 0.5 to 10 percent by weight, with respect to the weight of dry starting slag and alumina powders. The introduction of combustible additives decreases the bulk weight and improves porosity of the catalyst, and also simplifies the procedure of the active component application to the carrier. The concentration of added nitric acid aqueous solution is from 20 to 57 percent by weight.

Thus prepared catalyst (after reduction of metal) is ready for use.

For a better understanding of the invention by those skilled in the art, the following examples of its practical embodiment are given by way of illustration.

EXAMPLE 1 a. Slag from the production of ferrotitanium, having the composition, in percent by weight: $Al_2O_3$ 68.0; $TiO_2$ 14.0, CaO 11.5, MgO 3.0, FeO 2.5, $SiO_2$ 0.98, S 0.02 (as $SO_3$), is crushed on a jaw crusher into the particle size not over 4–6 mm and ground in a ball mill into the particle size not over for 48 hours. The ground slag is passed through a sieve having openings of 0.005 mm 0.05 mm. A mixer having Z-shaped paddles is loaded with 9.0 kg of the ground slag, having particle size less than 0.05 mm, 1.0 kg of nickelous oxide, 0.3 kg of graphite, 0.4 liter of a 20 percent solution of glycerol in distilled water. The charge is mixed for thirty minutes and then passed between rollers (3 times). The compacted charge, in the form of sheets, is rubbed through a metallic gauze having 1 mm mesh orifices and shaped into cylinders sizing 5 × 5 mm. The obtained cylinders of the catalyst are kept in air for 24 hours and then dried at a temperature of 90°C for 10–12 hours, and calcined in an electric furnace at a temperature of 1250°–1300°C, with subsequent retention at this temperature for 10–12 hours. The furnace is then switched off and the catalyst cooled. Thus prepared catalyst consists of 90 percent by weight of slag and 10 percent by weight of nickelous oxide, and after reduction with a nitrogen-hydrogen mixture at a temperature of 1000°C for twelve hours, nickelous oxide is reduced to metallic nickel. In order to lower the temperature from 1000° to 400°C, and to increase the activity, the said catalyst is impregnated with an aqueous solution of nitrates of nickel and aluminium for 30 minutes, after which the catalyst is dried and calcined at a temperature of 350°–500°C for 10–12 hours.

The solution of nickel and aluminium nitrates is prepared by dissolving in one liter of distilled water 1500 g of nickel nitrate and 580 g of aluminium nitrate at a temperature of 50°–60°C.

b. The process for preparing the catalyst is carried out by a procedure similar to that described in Example 1 (a) except that 6 kg of slag and 4 kg of nickelous oxide are taken. The composition of the mixture is 60 percent of slag and 40 percent by weight of nickel.

c. The process for preparing the catalyst is the same as described in Example 1 (a), except that the carrier is a mixture of slags prepared in the manufacture of ferrotitanium, nickelboron, ferroboron, ferroboral and ferrochromoboron by the aluminothermic method. Each slag is taken in the quantity of 1.8 kg, and 9 kg of the resultant mixture are mixed with 1 kg of nickelous oxide.

EXAMPLE 2

Slag prepared in the production of ferrotitanium having the composition, in percent by weight: $Al_2O_3$ 69.4, $TiO_2$ 12.6, CaO, 11.4, MgO 4.4, FeO 2.6, SiO 0.57, S 0.03 (calculated as $SO_3$), with particles sizing from 10 to 80 mm, is loaded into a mill and rolled without balls for 4–8 hours. The material is then sieved to separate the required fraction with particles sizing from 10 to 30 mm and from 30 to 60 mm.

In order to increase the specific surface and to remove all dust from lump surfaces, the lumps are boiled in distilled water for 2–4 hours, then calcined at a temperature 350°–500°C for 3–4 hours and impregnated with a solution of salts, nickel nitrate and aluminium nitrate, at a temperature of the solution of 50°–60°C (the solution of nickel nitrate and aluminium nitrate is prepared as described in Example 1, a). The impregnated lumps of slag are calcined at a temperature of 350°–500°C for 10–12 hours, i.e., until the applied nitrates are all decomposed. The said impregnation and calcining of the slag lumps is repeated 3 times. The finished catalyst contains 97 percent by weight of slag, 2 percent by weight of nickel oxides and 1 percent by weight of aluminium oxide. The catalyst is readily reduced by hydrogen at a temperature of 400°C for 4–6 hours.

EXAMPLE 3

Slag having the composition as in Example 1 (a) is mixed in the form of a paste with 56 percent solution of nitric acid, taking it in the quantity of 1.8 liter per 10 kg of slag. The prepared paste is placed into stainless steel moulds (diameter 98 mm, height 50 mm) and dried at a temperature to 500°C for 6–8 hours; the carrier is then removed from the moulds and calcined in gas or electric furnaces at temperatures from 1300° to 1600°C. The resultant product is a highly porous carrier in the form of blocks, 98 mm in diameter and 50 mm high. In order to apply the active component and the promoting agent to the carrier surfaces, it is impregnated with a solution of nitrates of nickel and aluminium (the composition of the solution as in Example 1, a) for thirty minutes at a temperature not below 50°C and calcined at a temperature of 350°–500°C for 10–12 hours. The finished catalyst contains 80 percent by weight of slag, 15 percent by weight of nickelous oxide and 5 percent of aluminium oxide.

EXAMPLE 4

The carrier and the catalyst are prepared by a procedure similar to that described in Example 3, except that into the slag having the composition, in percent by weight: $Al_2O_3$ 67.49, TiO 12.5, CaO 11.6, MgO 5.0, FeO 2.8, $SiO_2$ 1.1, S 0.01, added are 50 percent by weight of alumina containing 99.6 percent by weight of $Al_2O_3$, having particle size not more than 0.05 mm, and 2.3 liters of nitric acid. The obtained catalyst contains 41 percent by weight of slag, 41 percent by weight of alumina, 13 percent by weight of nickelous oxide and 5 percent by weight of applied aluminium.

EXAMPLE 5

The slag having the composition similar to that specified in Example 4, and containing 70 percent by weight of alumina with particles sizing not more than 0.05 mm, is mixed with a 20 percent solution of nitric acid taken in the quantity of 2.3 liters per 7 kg of alumina and per 3 kg of slag. The obtained paste is extruded by a screw in the form of a strand of 12 mm in diameter. The strand is cut into cylinders or rings of 10–12 mm. The prepared rings or cylinders are placed on a stainless steel trough, retained in the air for 24 hours, dried in a drier at a temperature of 50°–200°C for 10–12 hours, and calcined in a gas or electric furnace at a temperature of 1200°–1300°C for 10–12 hours. The carrier is cooled and impregnated with an aqueous solution of nickel nitrate and aluminium nitrate (the composition of the solution as in Example 1, a) at a temperature of 50°–60°C for 30–40 minutes. Thus impregnated carrier is calcined at a temperature of 350°–500°C until the applied salts of nitric acid are all decomposed. The impregnation and calcining are repeated (2–3 times). The finished catalyst contains 27.6 percent by weight of slag, 64.4 percent by weight of alumina, 6 percent of nickelous oxide and 2 of applied aluminium oxide.

The quantities of slag, alumina and nitric acid are specified in Table 2 (carrier samples 2–10). For the purpose of comparison, Table 2 contains also data for sample 1 and II, which contain slag and alumina 100 percent by weight respectively.

Table 2 shows that mechanical strength of the catalyst attains its maximum value when the carrier contains 50 percent by weight of slag and 50 percent by weight of alumina. However, the mechanical strength is rather high in samples of carrier containing from 10 to 70 percent of slag. As the slag content of the carrier increases, the consumption of nitric acid decreases. The Table also shows that the coefficient of thermal expansion decreases with growing slag content, which means that thermal stability increases.

EXAMPLE 6

A mixer provided with Z-type paddles is loaded with 10.0 kg of a crushed mixture of powders (having the composition as in Example 5), 3.0 liters of a 20 percent solution of nitric acid, 3.0 kg of a combustible additive - petroleum coke - and the components are well mixed for 50–60 minutes. The prepared paste is extruded by a screw into a strand 12 mm in dia. The strand is cut into cylinders of 12 mm high. The shaped carrier is kept in air for 24 hours at a temperature to 50°C, dried in a drier at a temperature of 50°–200°C for 10–24 hours, and then calcined at a temperature of 1400°C for 6–12 hours, and cooled. The carrier is then impregnated with a solution of nickel nitrate and aluminium nitrate (the composition as in Example 1,a) at a temperature of the solution of 50°–60°C for 30–60 minutes, and calcined at a temperature of 350°–500°C for a period of time sufficient to decompose the applied nitrates. The finished catalyst contains 24 percent by weight of slag, 56 percent by weight of alumina, 15 percent by weight of nickelous oxide, and 5 percent of applied aluminium oxide.

EXAMPLE 7

The carrier is prepared and the catalyst is applied to it by a procedure similar to that described in Example 6, except that 1.0 kg of wood meal is added instead of petroleum coke.

EXAMPLE 8

A porous carrier and the catalyst on its base are prepared by a procedure similar to that described in Example 5, except that the powder is treated by a 56 percent solution of nitric acid.

EXAMPLE 9

9.7 kg of alumina are mixed with 0.3 kg of titanium dioxide, fused, crushed, milled and the fraction with particles sizing not over 0.05 mm, is separated. Into the obtained alumotitanium powder, added is 1 kg of wood meal or petroleum coke, the mixture is wetted with a 20 percent solution of nitric acid and mixed to prepare a paste, which is then extruded into strands, which in turn are cut into cylinders (12×12 mm). The granules of the carrier ae kept in air, dried, and calcined at a temperature of about 1400°C. The cooled carrier is impregnated in a solution of nitrates of nickel and aluminium, (1500 g of nickel nitrate and 580 g of aluminium nitrate per liter of distilled water). The impregnation is carried out at a temperature of 50°C for thirty minutes. The impregnated carrier is dried, and calcined at a temperature of 350°–500°C, until the applied nitrates are all decomposed. The obtained catalyst contains 90.0 percent by weight of aluminium oxide, 2.7

Table 2

| Carrier sample Nos. | 1 | 2 | 3 | 4 | 5 | 6 | 7 | 8 | 9 | 10 | 11 |
|---|---|---|---|---|---|---|---|---|---|---|---|
| Slag content, %(w/w) | 0,0 | 10 | 20 | 30 | 40 | 50 | 60 | 70 | 80 | 90 | 100 |
| Alumina content, %(w/w) | 100 | 90 | 80 | 70 | 60 | 50 | 40 | 30 | 20 | 10 | 0,0 |
| Volume of 20% solution of nitric acid per kg, in ml | 300 | 277 | 254 | 231 | 208 | 185 | 162 | 139 | 116 | 93 | 80 |
| Mechanical strength after calcining (end crushing stress), kg/cm$^2$ | 200 | 1400 | 2400 | 2800 | 2550 | 2850 | 1200 | 500 | 450 | 400 | 310 |
| α - coefficient of thermal expansion, degree$^{-1}$ | $11.1 \times 10^{-6}$ | | | | | $8 \times 10^{-6}$ | | | | | $4 \times 10^{-6}$ | percent by weight of titanium oxide, and 7.3 percent by weight of nickel oxides. The mechanical strength of the catalyst before operation is 460 kg/cm$^2$, and after operation 400 kg/sq.cm. All other basic characteristics of the catalyst are similar to those iherent in the catalyst prepared in Example 6.

The catalyst prepared in Examples 3 and 5 were tested for activity in the process of steam conversion of natural gas purified from sulphur and sulphurous compounds, at a volumetric velocity of passage of 2000 hour$^{-1}$, the ratio of steam to gas being 2.0:1.0 and the pressure being 1 atm. The data obtained are given in Table 3. For the purpose of comparison the Table contains also data for testing, in the same conditions, of the known catalyst.

The catalyst prepared in Example 5 was tested in industrial conditions of steam-oxygen conversion of methane under pressure. The composition of natural gas is as follows, in percent by volume: methane 88.17, ethane 4.025, propane 1.544, i-butane 0.56, i-pentane 0.205, n-pentane 0.142, Ar+O$_2$ 0.264, N 4.75, other gases 0.3, H$_2$S 0.107, mercaptans 0.535, CS$_2$ 0.103, (sulfur$_{total}$ 0.749 mg/cu.m.). The results of the test are given in Table 4. For the purpose of comparison the Table contains also the data for testing the known catalyst.

The continuous running of an industrial methane converter with the proposed catalyst has increased to two years while with the known catalyst the continuous operation of the same methane converter is on an average two months.

Table 4 shows also that the proposed catalyst, while working under pressures of 18.5 atm, at lower ratios of steam to natural gas and of oxygen to natural gas, at maximum feed rates of 12000 cu.m per hour, displays more reliable operation compared with the known catalyst.

Table 3

| Example Nos | Temperature, °C | Composition of dry converted gas, % vol. | | | |
|---|---|---|---|---|---|
| | | CO$_2$ | CO | H$_2$ | CH$_4$ |
| 1 | 2 | 3 | 4 | 5 | 6 |
| 3 | 400 | 10.8 | 0.5 | 37.1 | 51.6 |
| | 500 | 13.4 | 2.0 | 56.5 | 28.1 |
| | 600 | 10.6 | 9.9 | 68.3 | 11.2 |
| | 700 | 87.0 | 14.9 | 73.9 | 2.6 |
| | 800 | 5.1 | 19.2 | 75.4 | 0.3 |
| 5 | 400 | 10.6 | 0.6 | 37.2 | 51.6 |
| | 500 | 13.1 | 2.2 | 53.6 | 28.1 |
| | 600 | 10.8 | 9.9 | 68.3 | 11.0 |
| | 700 | 8.8 | 14.9 | 73.9 | 2.4 |
| | 800 | 5.2 | 19.3 | 75.4 | 0.1 |

Table 3-continued

| Example Nos | Temperature, °C | Composition of dry converted gas, % vol. | | | |
|---|---|---|---|---|---|
| | | CO$_2$ | CO | H$_2$ | CH$_4$ |
| 1 | 2 | 3 | 4 | 5 | 6 |
| Known catalyst | 400 | 10.5 | 0.6 | 37.2 | 51.7 |
| | 500 | 13.2 | 2.2 | 56.4 | 28.2 |
| | 600 | 10.8 | 9.9 | 68.1 | 11.2 |
| | 700 | 8.9 | 15.0 | 73.2 | 2.9 |
| | 800 | 5.6 | 19.0 | 75.1 | 0.4 |

Table 4

| Catalyst | Pressure in converter, atm | Gas Consumption, cu.m/h | | | Ratio | |
|---|---|---|---|---|---|---|
| | | natural gas | steam | oxygen | steam: natural gas | oxygen: natural gas |
| 1 | 2 | 3 | 4 | 5 | 6 | 7 |
| Known | 18.5 | 12000 | 36456 | 8700 | 3.04 | 0.73 |
| Proposed | 18.5 | 12000 | 35340 | 7900 | 2.96 | 0.658 |

| Converter resistance, atm | Temperature, °C | | Residual methane in converted gas, % by volume |
|---|---|---|---|
| | at inlet | at outlet | |
| 8 | 9 | 10 | 11 |
| 1.9 | 345 | 805 | 2.0 |
| 1.75 | 335 | 860 | 1.9 |

Table 5

| Gas composition | Gas analysis, % By volume | | | |
|---|---|---|---|---|
| | Before conversion | After conversion | | |
| | | $\omega$=3000 hour$^{-1}$ | $\omega$=1500 hour$^{-1}$ | $\omega$=1000 hour$^{-1}$ |
| CH$_4$+N | 81.4–83.2 | 87.0–88.2 | 94.0–95.0 | 95.0–96.0 |
| C$_2$H$_6$ | 2.8–3.2 | 2.3–2.7 | 0.8–1.0 | 0.0 |
| C$_3$H$_8$ | 0.8–1.2 | 0.4–0.6 | 0.0 | 0.0 |
| CO$_2$ | 0.3–0.6 | 0.0 | 0.0 | 0.0 |
| H$_2$ | 13.0–14.0 | 9.0–9.5 | 4.8–5.2 | 4.5–5.0 |

Table 6

| Catalyst | % residual ammonia, at °C | | | | | | |
|---|---|---|---|---|---|---|---|
| | 600 | 650 | 700 | 780 | 775 | 800 | 900 |
| Known | 0.220 | 0.100 | 0.055 | 0.036 | 0.025 | 0.021 | 0.019 |
| Proposed | 0.210 | 0.100 | 0.053 | 0.034 | 0.024 | 0.020 | 0.017 |

Table 7

| | Mechanical strength of catalyst, kg/sg.cm$^2$ | |
|---|---|---|
| Example | Before conversion | After 4 months of service |
| 1a | 1583 | 1271 |
| 2 | 987 | 980 |
| 3 | 98 | 95 |
| 4 | 96 | 93 |
| 5 | 821 | 819 |
| 6 | 341 | 337 |
| 7 | 297 | 285 |
| 8 | 386 | 380 |
| known catalyst | 600 | destroyed |

The catalyst prepared in Examples 5–8 was tested in conditions of low-temperature conversion of methane homologues in natural gas, that is in the process of natural gas purification from homologues of methane and oxycompounds (stabilization of natural gas composition). The test data are given in Table 5.

The catalyst prepared in Examples 5 and 6 was tested in the process for preparing hydrogen by decomposing ammonia. The test data are given in Table 6, which contains also, for the purpose of comparison, data for the known catalyst.

The mechanical strength of the proposed catalyst is illustrated in Table 7, the thermal stability data are given in Table 8, and the data characterizing the bulk weight of the catalysts according to the invention are given in Table 9.

As Table 7 shows, the mechanical strength of the proposed catalyst is high and only insignificantly lowers in the process of work, during which the known catalyst is destroyed.

Table 8

Thermal stability of catalyst, number of cyclic temperature variation from 25 to 1200°C

| Example Nos. | Number of cycles of catalyst work without destruction |
|---|---|
| 1 | 2 |
| 1, a | over 50 |
| 2 | over 50 |
| 3 | over 50 |
| 4 | over 50 |
| 5 | over 50 |
| 6 | over 50 |
| 7 | over 50 |
| 8 | over 50 |
| Known catalyst | less than 30 |

All catalysts prepared in Examples 1 through 8, and also in Example 9, are not practically destroyed with heating over acetylene burner, until they are fused at a temperature of 2100°C, while the known catalyst is decomposed.

What we claim is:

1. A carrier for catalysts used in catalytic chemical processes which consists of a metallurgical slag, consisting of a fused mixture of oxides formed in the production of ferrotitanium, ferroboral, ferrochromoboron, nickel-boron and ferroboron, taken in the following quantities:

| | weight % |
|---|---|
| aluminium oxide | 50–80 |
| nickel oxide | 0–10 |
| titanium oxide | 0–18 |
| magnesium oxide | 1–10 |
| calcium oxide | 3–25 |
| iron oxides | 1–20 |
| silicon oxide | 1–4 |
| boron oxide | 0–15 |
| and chromium oxide | 0–1. |

2. A catalyst for catalytic chemical processes used in the conversion of natural gas, dissociation of ammonia, stabilization of natural gas, in which catalytically active nickel material in the form of nickel metal or oxide in an amount of from 0.3 to 40 wt % is applied to a formed carrier or mixed therewith before formation, said carrier being a fused mixture of oxides comprising:

| | weight % |
|---|---|
| aluminum oxide | 50-80 |
| nickel oxide | 0-10 |
| titanium oxide | 0-18 |
| magnesium oxide | 1-10 |
| calcium oxide | 3-25 |
| iron oxide | 1-20 |
| silicon oxide | 1-4 |
| boron oxide | 0-15 |

-continued

| | weight % |
|---|---|
| chromium oxide | 0-1. |

3. A catalyst according to claim 2, in which the active component is contained in the quantity from 0.3 to 36 percent by weight, calculating with reference to metal.

4. A catalyst for chemical processes in which the catalytically active material is applied onto a carrier which is a fused mixture of aluminium oxide, taken in the quantity of not less than 50 percent by weight, with at least one of the refractory oxides selected from the group consisting of an oxide of titanium, nickel, magnesium, calcium, iron, silicon, boron, and chromium.

5. The catalyst according to claim 2, in which the catalytically active nickel material is applied onto a fused mixture of oxides consisting of 79–99.7 percent by weight of aluminium oxide and from 0.3 to 21 percent by weight of titanium oxide.

6. The catalyst according to claim 4, wherein the catalytically active material is applied onto said carrier consisting of a metallurgical slag comprising a fused mixture of oxides hving a composition in the range:

| | weight % |
|---|---|
| aluminium oxide | 50-80 |
| nickel oxide | 0-10 |
| titanium oxide | 0-18 |
| magnesium oxide | 1-10 |
| calcium oxide | 3-25 |
| iron oxide | 1-20 |
| silicon oxide | 1-4 |
| boron oxide | 0-15 |
| and chromium oxide | 0-1. |

7. A method for preparing a catalyst for catalytic chemical processes used for the conversion of natural gas, dissociation of ammonia, or the stabilization of natural gas which comprises the successive steps of:
crushing and grinding a fused mixture of refractory oxides containing 50–80 wt % of alumina, the balance being at least 1 of the refractory oxides selected from the group consisting of titanium oxide, magnesium oxide, calcium oxide, iron oxides, silicon oxide, boron oxide and chromium oxides to form a mix;
adding a combustible agent selected from the group consisting of petroleum coke, in an amount of 1 to 30 wt %, and wood meal, in an amount of from 0.5 to 10 wt % to the mix;
adding to the resulting mixture concentrated nitric acid in an amount sufficient for the formulation of a granulation mass from said mixture;
granulating said resulting mass;
drying the granules;
calcining the granules to form a catalyst carrier;
impregnating said carrier with a solution of nickel nitrate;
and then calcining the impregnated carrier at a temperature of 350° – 450°C until the deposited nickel nitrate is completely decomposed thereby forming nickel metal, or its oxides, as the catalytically active material, on said carrier.

8. The method according to claim 7 wherein said fused mixture of refractory oxides is a metallurgical slag formed in the production of ferrotitanium, ferroboral, ferrochromoboron, nickelboron, ferroboron.

* * * * *